United States Patent [19]

Lee, Jr. et al.

[11] Patent Number: 5,731,754
[45] Date of Patent: *Mar. 24, 1998

[54] TRANSPONDER AND SENSOR APPARATUS FOR SENSING AND TRANSMITTING VEHICLE TIRE PARAMETER DATA

[75] Inventors: James E. Lee, Jr., Pinckney; Harvey J. Kulka, Britton; John H. Schramm, Ann Arbor, all of Mich.

[73] Assignee: Computer Methods Corporation, Livonia, Mich.

[*] Notice: The term of this patent shall not extend beyond the expiration date of Pat. No. 5,483,827.

[21] Appl. No.: 402,188

[22] Filed: Mar. 10, 1995

Related U.S. Application Data

[63] Continuation-in-part of Ser. No. 254,206, Jun. 3, 1994, Pat. No. 5,483,827.

[51] Int. Cl.⁶ .................................................. B60C 23/00
[52] U.S. Cl. .......................... 340/447; 340/442; 340/445; 340/825.54; 73/146.4; 73/146.5
[58] Field of Search ...................... 340/442, 443, 340/444, 445, 446, 447, 449, 825.54; 73/146.5, 146.4, 146.2; 200/61.22; 116/34 R

[56] References Cited

U.S. PATENT DOCUMENTS

| | | | |
|---|---|---|---|
| 2,274,557 | 2/1942 | Morgan et al. | 73/146.2 |
| 3,232,330 | 2/1966 | Puls | 152/152.1 |
| 3,613,075 | 10/1971 | Griffiths et al. | 340/444 |
| 3,723,966 | 3/1973 | Mueller et al. | 340/447 |
| 3,770,040 | 11/1973 | De Cicco | 152/152.1 |
| 3,787,806 | 1/1974 | Church | 346/447 |
| 3,893,228 | 7/1975 | George et al. | 437/93 |
| 4,010,354 | 3/1977 | Apicella, Jr. et al. | 235/376 |
| 4,067,235 | 1/1978 | Markland et al. | 73/146.5 |
| 4,074,227 | 2/1978 | Kalmus | 340/58 |
| 4,137,520 | 1/1979 | Deveau | 340/447 |
| 4,160,234 | 7/1979 | Karbo et al. | 340/443 |
| 4,199,991 | 4/1980 | Kodama | 73/706 |
| 4,237,728 | 12/1980 | Betts et al. | 73/146.5 |
| 4,317,126 | 2/1982 | Gragg, Jr. | 257/419 |
| 4,334,215 | 6/1982 | Frazier et al. | 340/539 |
| 4,392,382 | 7/1983 | Myers | 73/708 |
| 4,446,447 | 5/1984 | McNamara | 331/42 |
| 4,450,431 | 5/1984 | Hochstein | 340/447 |
| 4,543,457 | 9/1985 | Petersen et al. | 200/83 N |
| 4,570,152 | 2/1986 | Melton et al. | 340/446 |
| 4,578,992 | 4/1986 | Galasko et al. | 73/146.5 |
| 4,588,978 | 5/1986 | Allen | 340/448 |
| 4,657,289 | 4/1987 | Boyer | 290/1 R |
| 4,695,823 | 9/1987 | Vernon | 340/447 |
| 4,701,826 | 10/1987 | Mikkor | 361/283.4 |
| 4,717,905 | 1/1988 | Morrison, Jr. et al. | 340/58 |
| 4,730,188 | 3/1988 | Milheiser | 340/825 |
| 4,734,034 | 3/1988 | Maness et al. | 433/68 |
| 4,739,328 | 4/1988 | Koelle et al. | 342/44 |
| 4,816,839 | 3/1989 | Landt | 343/795 |
| 4,845,649 | 7/1989 | Eckardt et al. | 364/571.02 |

(List continued on next page.)

FOREIGN PATENT DOCUMENTS

| 544136 | 6/1993 | European Pat. Off. . |
|---|---|---|
| 595549 | 5/1994 | European Pat. Off. . |

OTHER PUBLICATIONS

Koelle et. al., "Short Range Radio Telemetry . . . Using Modulated Backscatter", IEEE, Aug. 75, pp. 1260–1261.

*Primary Examiner*—Jeffery Hofsass
*Assistant Examiner*—Ashok Mannava
*Attorney, Agent, or Firm*—Young & Basile, P.C.

[57] ABSTRACT

A transponder and sensor apparatus with on-board power supply is mounted in or on a vehicle tire. A pressure sensor, a temperature sensor and a tire rotation sensor are mounted in a housing along with the transponder, the power supply and an antenna. Upon receiving an interrogation signal from a remote interrogator, the transponder activates the sensors to sense tire pressure and temperature and then backscatter-modulates the radio frequency signal from the interrogator with the tire condition parameter data from the sensors to return the backscatter modulated signal to the interrogator.

32 Claims, 6 Drawing Sheets

U.S. PATENT DOCUMENTS

| | | | |
|---|---|---|---|
| 4,851,809 | 7/1989 | McAlister | 340/442 |
| 4,856,993 | 8/1989 | Maness et al. | 433/68 |
| 4,862,486 | 8/1989 | Wing et al. | 377/16 |
| 4,888,591 | 12/1989 | Landt et al. | 342/44 |
| 4,894,639 | 1/1990 | Schmierer | 340/442 |
| 4,911,217 | 3/1990 | Dunn et al. | 152/152.1 |
| 4,978,941 | 12/1990 | Brown | 340/447 |
| 5,030,807 | 7/1991 | Landt et al. | 235/375 |
| 5,035,137 | 7/1991 | Burkard et al. | 340/442 |
| 5,055,659 | 10/1991 | Hendrick et al. | 235/439 |
| 5,061,917 | 10/1991 | Higgs et al. | 340/539 |
| 5,165,281 | 11/1992 | Bell | 73/718 |
| 5,181,975 | 1/1993 | Pollack et al. | 152/152.1 |
| 5,192,929 | 3/1993 | Walker et al. | 340/444 |
| 5,218,861 | 6/1993 | Brown et al. | 73/146.5 |
| 5,228,337 | 7/1993 | Sharpe et al. | 73/146.5 |
| 5,231,872 | 8/1993 | Bowler et al. | 73/146.5 |
| 5,235,850 | 8/1993 | Schurmann | 73/146.5 |
| 5,247,831 | 9/1993 | Fioravanti | 73/178 R |
| 5,285,189 | 2/1994 | Nowicki et al. | 340/447 |
| 5,297,424 | 3/1994 | Sackett | 73/146.5 |
| 5,302,939 | 4/1994 | Downs et al. | 340/447 |
| 5,319,354 | 6/1994 | Myatt | 340/572 |
| 5,348,067 | 9/1994 | Myatt | 152/152.1 |
| 5,413,159 | 5/1995 | Olney et al. | 152/418 |
| 5,483,826 | 1/1996 | Schultz et al. | 73/146.5 |
| 5,483,827 | 1/1996 | Kulka et al. | 73/146.5 |
| 5,500,065 | 3/1996 | Koch et al. | 156/123 |
| 5,505,080 | 4/1996 | McGhee | 73/146.5 |
| 5,524,034 | 6/1996 | Srygley et al. | 377/15 |
| 5,540,092 | 7/1996 | Handfield et al. | 73/146.5 |
| 5,573,611 | 11/1996 | Koch et al. | 152/152.1 |
| 5,602,524 | 2/1997 | Mock et al. | 340/447 |

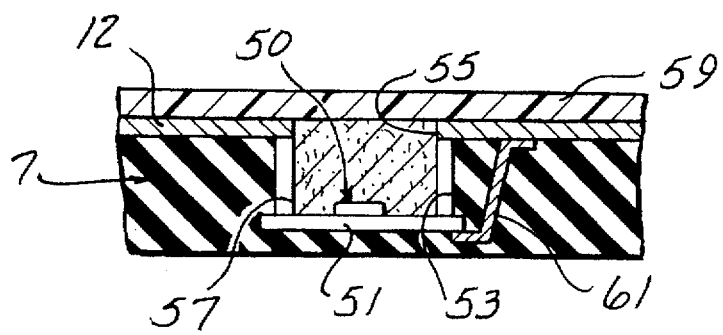
FIG·6
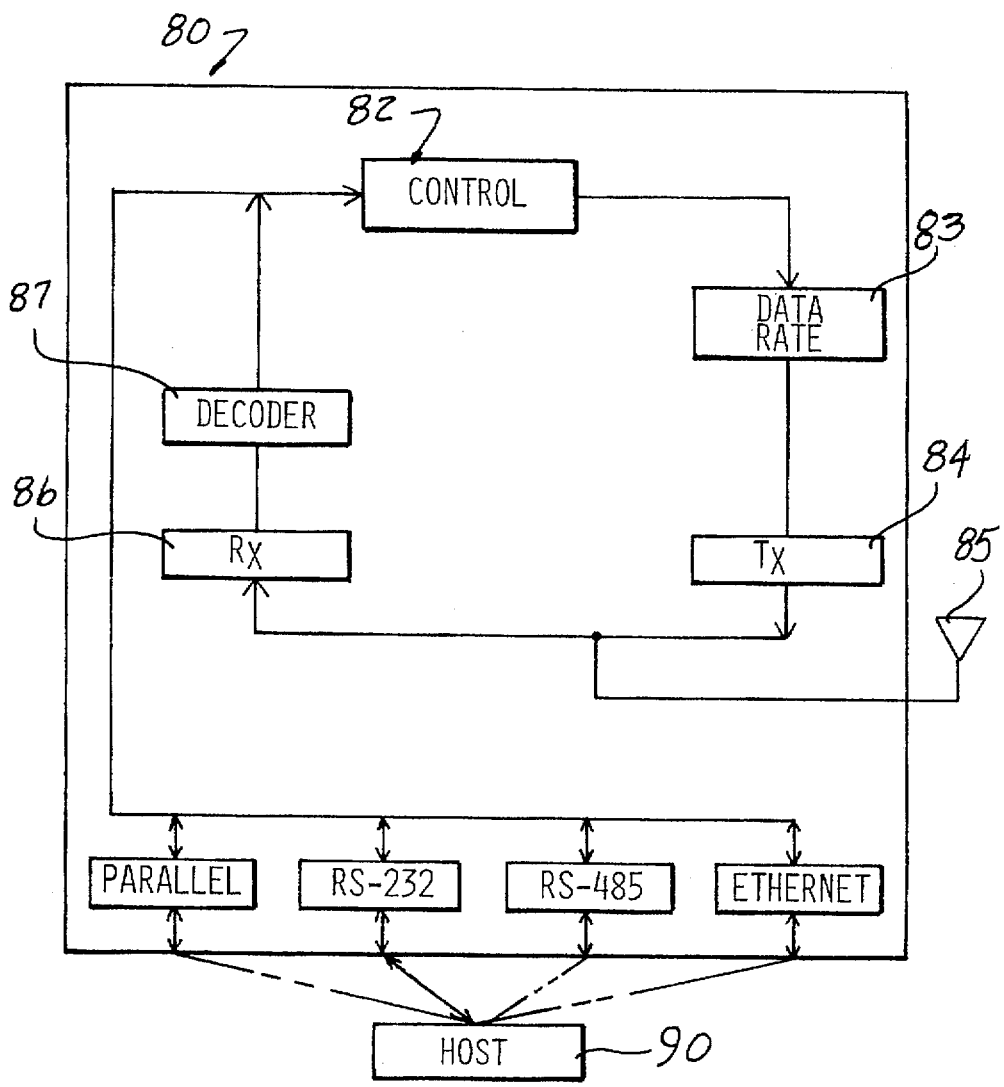
FIG·9

TRANSPONDER AND SENSOR APPARATUS FOR SENSING AND TRANSMITTING VEHICLE TIRE PARAMETER DATA

CROSS REFERENCE TO CO-PENDING APPLICATION

This application is a continuation-in-part of application Ser. No. 07/254,206, filed Jun. 3, 1994 in the names of Harvey J. Kulka and John H. Schramm, co-pending on the filing date of this application and now U.S. Pat. No. 5,483,827 issued Jan. 16, 1996.

BACKGROUND OF THE INVENTION

The present invention relates, in general, to vehicle tires and, more specifically, to transponders mounted in or on vehicle tires for transmitting tire identification and/or operating condition data.

DESCRIPTION OF THE ART

Recently there has developed interest in mounting transponders in or on a vehicle tire to provide tire identification data during the manufacture and use of the tire. Further developments have led to the mounting of such transponders in the tire to sense and transmit tire pressure data along with tire identification data, as shown in U.S. Pat. Nos. 4,911,217; 5,181,975 and 5,218,861.

The devices disclosed in these and other related patents utilize a passive integrated circuit transponder which is mounted directly within the tire during the manufacture of the tire or under a patch attached to an exterior side wall of the tire. The transponder responds to an interrogation signal from a unit external to the tire and uses the interrogation signal as a source of electrical energy to transmit digital signals relating to a tire identification code and/or tire pressure data. Due to the mounting of the transponder within the tire in close proximity to the steel belts found in most vehicle tires, a specially constructed antenna is required. Such antennas are in the form of two spaced electrodes or a coil of wire turns. Further, such transponders are required to be mounted in a specific location within the tire in order to receive and transmit signals at adequate signal strength levels without interference.

In addition to a unique tire identification code for a tire which is stored in a memory on the integrated circuit transponder, such devices also incorporate a pressure sensor mounted on the circuit board containing the transponder to provide tire pressure data at the time of receipt of the interrogation signal. Such pressure sensors are in the form of an elastomeric material having a variable conductivity, as well as piezo-resistive transducers, silicone capacitive pressure transducers, or a variable conductant laminant of conductive ink. The transponder includes circuitry for digitizing the pressure data for transmission with or without tire identification data to the external interrogation source.

U.S. Pat. No. 4,695,823 discloses a transponder with an internal or on-board power supply in the form of a long period oscillator connected to a battery. The oscillator actuates a temperature and/or pressure sensor at a set time to obtain the temperature and pressure of the tire. The sensed temperature and pressure are compared with preset temperature and pressure threshold values and, when the threshold values are exceeded, the transponder transmits an encoded signal representative of the out-of-range temperature or pressure signal to a remote location, such as a light display mounted on the vehicle to provide an indication that at least one of the temperature and pressure threshold values have been exceeded.

However, such tire mounted transponders, while effectively transmitting tire identification and certain tire pressure or temperature data, are not without limitation. Most of the previously devised tire mounted transponders are passive and receive electrical power from an external interrogation signal source. This limits the effective distance range between the external interrogation signal source and the transponder. Indeed, such external interrogation sources have utilized a hand-held wand which must be placed immediately adjacent to the tire to transmit the interrogation signal to the transponder on the tire and to receive the data signals therefrom.

Such tire mounted transponders have also required special antenna configurations and mounting positions on the tire to provide adequate data signal strength. Further, since such transponders are actuated only upon the receipt of an interrogation signal or at a set time through an on-board oscillator, such transponders only transmit instantaneous pressure and temperature data at the time of receipt of the interrogation signal or the activation signal from the on-board oscillator. Such transponders are incapable of actively accumulating pressure and temperature data, such as maximum or minimum tire pressure and temperature, over a set period of use of the tire. Such tire mounted transponders are also incapable of determining the actual usage of the tire in terms of miles of use. The aforementioned maximum and minimum temperature and pressure, as well as the amount of use of a tire, are extremely useful parameters in determining the condition of the tire in order to extend wear, remaining useful life, safe or unsafe tire condition, etc.

Thus, it would be desirable to provide a transponder and tire parameter sensor apparatus which can be mounted in a large number of different positions within or on a vehicle tire without the need for a special antenna configuration. It would also be desirable to provide such a tire mounted transponder and sensor apparatus which operates in a semi-active mode to automatically and continuously sense, record and transmit tire operating parameters during the use of the tire on a vehicle. It would also be desirable to provide a tire mounted transponder and sensor apparatus which is capable of storing such tire operating parameters for subsequent transmission to an external control source upon receipt of an interrogation signal from the external control source. It would also be desirable to provide a tire mounted transponder and sensor apparatus which is capable of monitoring various tire operating parameters, including pressure, temperature and number of revolutions of the tire, over a predetermined time period and to detect maximum and minimum values of at least certain of such parameters. It would also be desirable to provide a tire mounted transponder and sensor apparatus which is operable, without repair or part replacement, for the entire expected life of the tire. Finally, it would be desirable to provide a tire mounted transponder and sensor apparatus which is capable of receiving interrogation signals from an external control source and for transmitting tire operating parameter data to the external control source over longer distances as compared to previously devised tire mounted transponders.

SUMMARY OF THE INVENTION

The present invention is a transponder and sensor apparatus for sensing and transmitting vehicle tire condition parameters to a remote location external of a vehicle.

The apparatus includes a housing which is mounted within or on a tire. A transponder is mounted in the housing and includes a processor means and a memory storing a control program executed by the processor means. A receiver means, formed as a part of the transponder, is provided for receiving an interrogation signal from a remote interrogation source. A backscatter modulating means is formed as part of the transponder and is connected to the processor means. The backscatter modulating means modulates the interrogation signal received from the remote source with sensor output data to return a backscatter modulated signal to the interrogation source including the sensor data as well as other data stored in the memory.

Sensor means are mounted in the housing for sensing one or more tire parameters, such as pressure, temperature and/or number of revolutions of the tire. The sensor means outputs signals to the processor means representative of the sensed tire parameter.

In a preferred embodiment, the sensor means includes a pressure sensor mounted in the housing for sensing the air pressure of the tire. A temperature sensor is also mounted in the housing for sensing the temperature of the tire. A tire revolution sensor is also mounted in the housing and detects each complete 360° revolution of the tire.

The output signals from each of the sensors are input to the processor. The pressure and temperature sensor output signals may be compared with previous or preset maximum and/or minimum pressure and temperature values, with such maximum and minimum values being updated and stored in the memory as necessary.

A power supply is mounted in the housing for supplying electrical power to the processor means, the receiver means, and the sensor means. An antenna means is also mounted in or on the housing for receiving the interrogation signal from the remote interrogation source and for returning the backscatter modulated signal to the remote interrogation source.

Upon receipt of an interrogation signal from a remote interrogation source, the processor activates the sensors to sense current tire pressure and temperature. The backscatter modulating means then backscatter modulates the Rf interrogation signal with the sensor data and other tire information and returns a backscatter modulated signal to the remote interrogation source containing data representations of the sensed tire parameters, including some or all of the current tire pressure and temperature, accumulated tire revolution count, maximum and minimum pressure and temperature over a predetermined time period, as well as tire identification code, the specific tire location on the vehicle, and other useful tire condition data stored in the transponder memory.

The remote interrogation source comprises a suitable control which transmits a radio frequency interrogation signal over a predetermined distance when the vehicle containing one or more transponders of the present invention is within the predetermined distance. The control also receives and decodes the Rf signal from the identified transponder and either stores the data contained therein and/or retransmits such data to an external host computer for analysis, storage, etc. The control may also be capable of writing data to the processor in the transponder for storage in the memory thereof.

The apparatus of the present invention overcomes certain of the limitations encountered with previously devised tire mounted transponders. The present apparatus includes a backscatter modulator which backscatter modulates the Rf interrogation signal. This eliminates the need for a separate transmitter on the transponder thereby reducing overall power requirements and increasing the useful life of the power source in the apparatus. The backscatter modulator backscatter modulates the sensed tire parameter data, such as tire pressure, tire temperature and/or tire revolution count, as well as other tire identification or operating features stored in the memory of the transponder onto the Rf interrogation signal for return to the interrogation source.

The apparatus of the present invention includes a transponder which is mounted along with the on-board power supply and the various sensors in a single, small housing thereby facilitating the easy mounting of the apparatus within or on a vehicle tire in a number of different possible mounting positions, The power source provides sufficient power to operate the apparatus throughout the entire useful life of the tire, including several recappings of a tire.

BRIEF DESCRIPTION OF THE DRAWING

The various features, advantages and other uses of the present invention will become more apparent by referring to the following detailed description and drawing in which:

FIG. 6 is a cross-sectional view of the pressure sensor shown in FIG. 2;

FIG. 9 is a block diagram of the remote interrogation unit.

DESCRIPTION OF THE PREFERRED EMBODIMENTS

Figure 1:
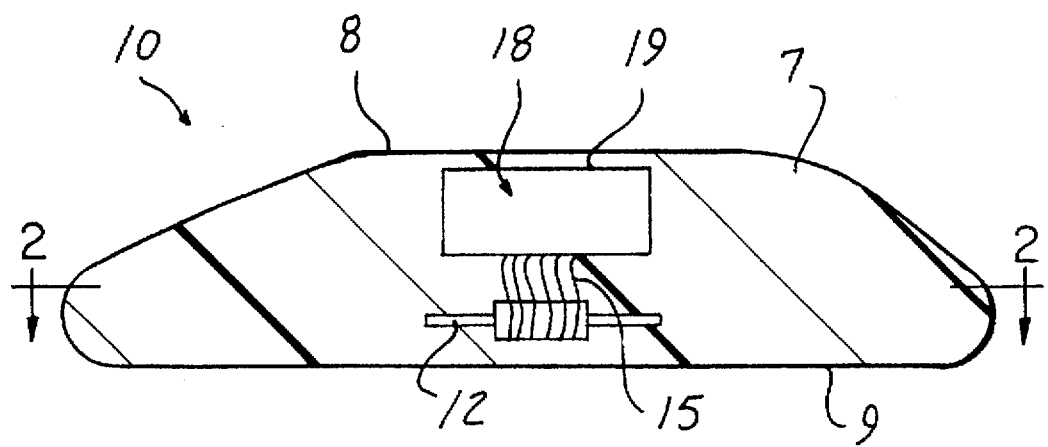
FIG. 1 is a partially sectioned side elevational view of an apparatus constructed in accordance with the teachings of the present invention, with a portion of the encapsulating material removed to show the components mounted therein.
Figure 2:
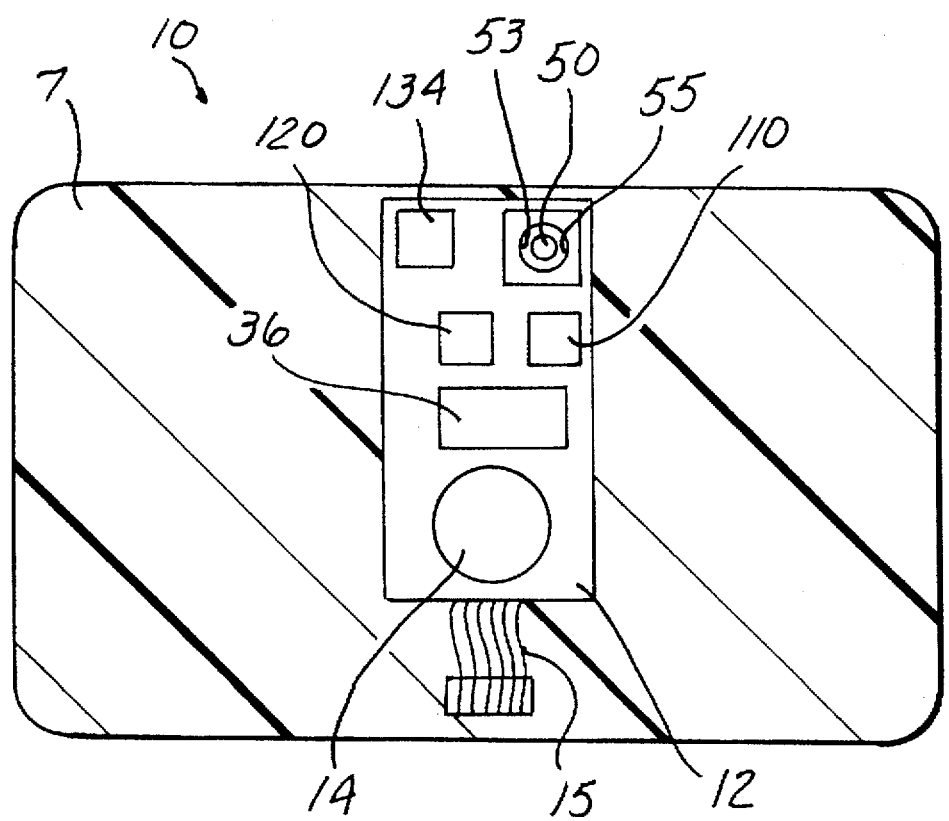
FIG. 2 is a cross sectional view generally taken along line 2—2 in FIG. 1.

Referring now to the drawing, and to FIGS. 1 and 2 in particular, there is depicted an apparatus 10 which is suitable for mounting within or on a vehicle tire and which operates to sense and transmit various tire condition parameters to a remote interrogation unit.

The apparatus 10 includes an electrically insulated substrate 12. Preferably, the substrate 12 is flexible to enable its conformance to the shape of a tire when mounted within or on a vehicle tire, as described hereafter. By way of example only, the substrate 12 is formed of a flexible polyamide film sold under the registered trademark "KAPTON".

The substrate 12, the various sensors described hereafter, and a transponder 18 mounted on or adjacent to the substrate 12 are disposed in a housing 7 formed of an encapsulating medium 7. Preferably, the encapsulating medium 7 is formed of a cured rubber for compatibility with a vehicle tire. The medium 7 may be formed to any desired shape. By way of example only, the medium 7 is formed with a first, substantially planar surface 8, an opposed, planar, second surface 9 and tapering side walls joining the first and second surfaces 8 and 9.

Figure 4:
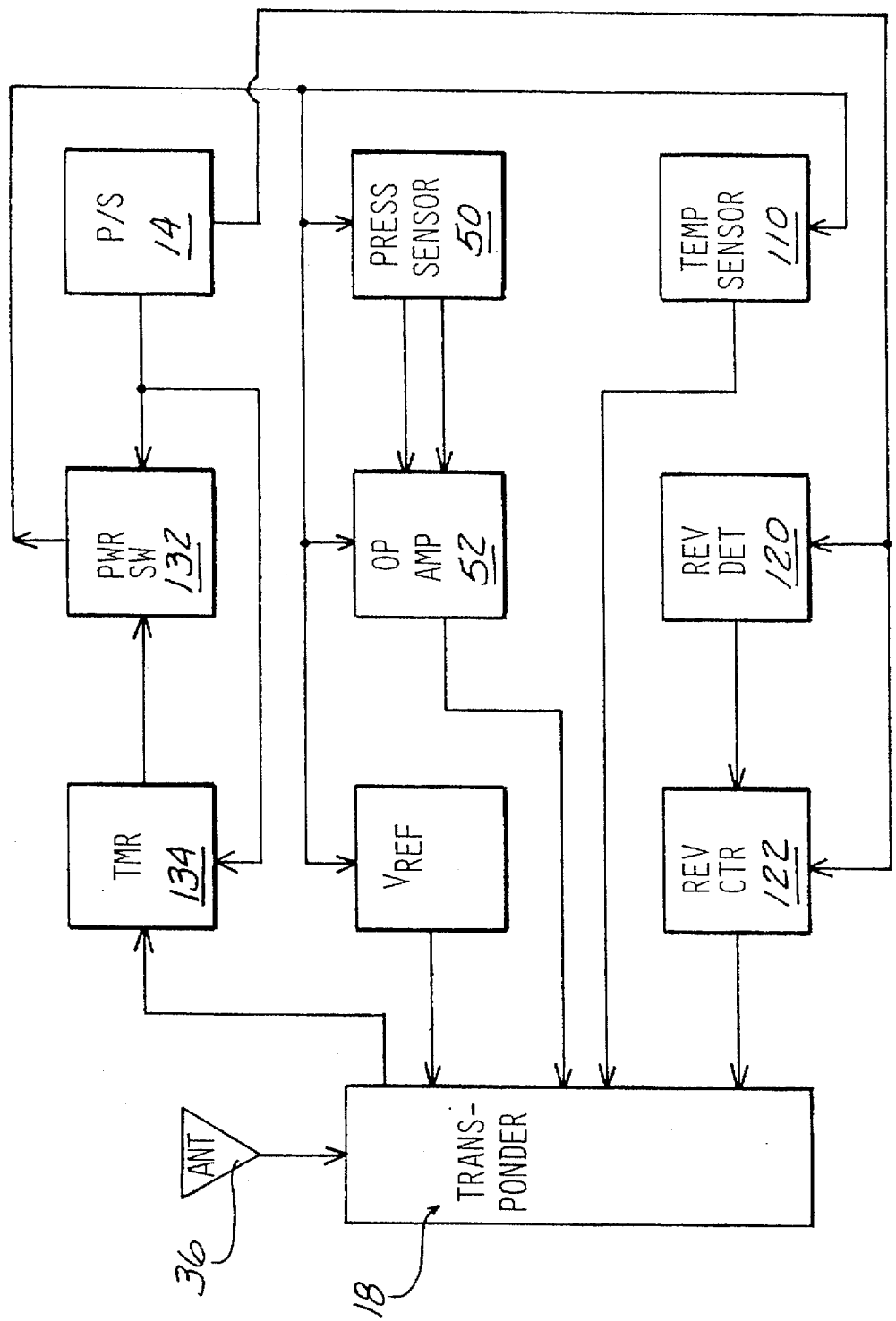
FIG. 4 is a block diagram of the major components of the apparatus shown in FIGS. 1 and 2.
Figure 5:
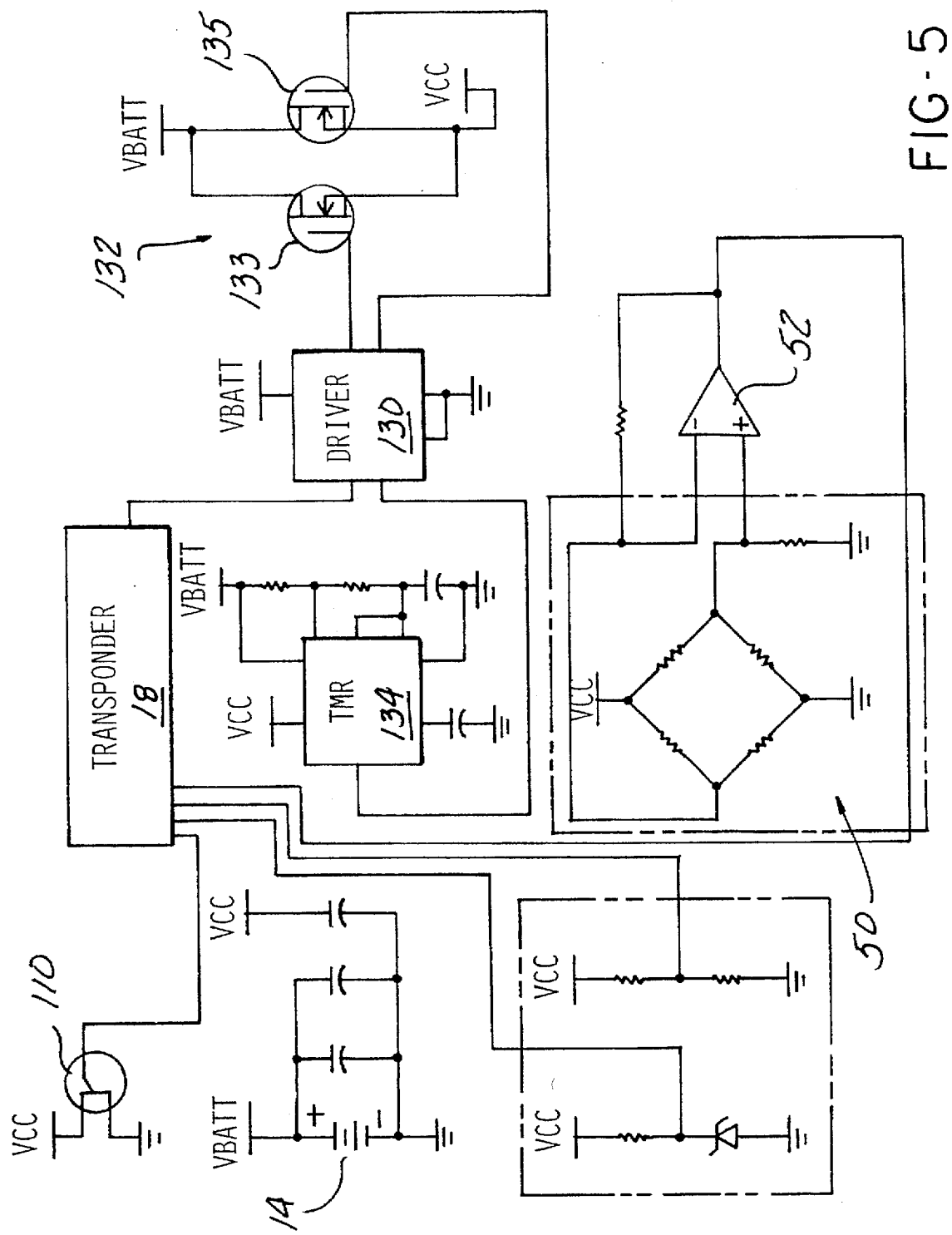
FIG. 5 is a schematic diagram of the apparatus shown in FIGS. 1, 2 and 4.

As shown in FIG. 2, and in detail in FIGS. 4 and 5, a power source, such as a battery 14, is mounted on the substrate 12. Any suitable battery 14 which is small in size and has a long life with a suitable amphour capacity may be employed. By way of example only, a 3.67 volt, 0.07 amp hour lithium, thionyl chloride battery, type 7–10, made by Battery Engineering, Inc., of Hyde Park, Mass. may be employed as the battery 14. This battery has an extremely small size of approximately 7.0 mm in diameter × 7.8 mm long. The terminals of the battery 14 are connected by conductors to the operative components of the apparatus 10 and through a cable 15 to the transponder 18.

The transponder 18 is employed in the apparatus 10 in a radio frequency transponder which is mounted in an enclosure 19. The transponder 18 and associated circuitry is connected by the cable 15 to the power supply or battery 14 as well as to other components as described hereafter.

Figure 3:
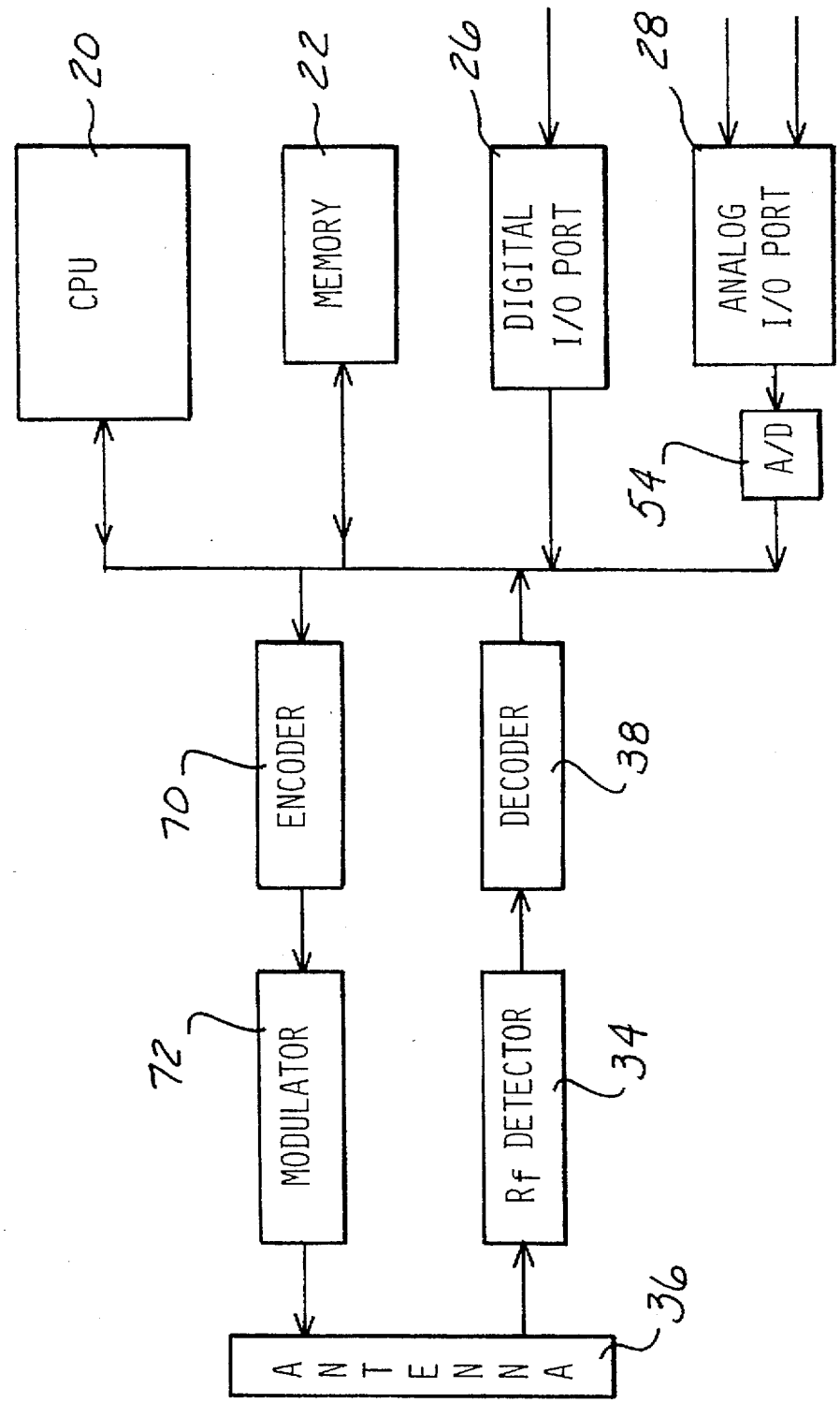
FIG. 3 is a block diagram of the transponder shown in FIG. 1.

As shown in FIG. 3, the transponder 18 includes a processor means or central processing unit 20 which communicates with a memory 22. The memory 22 may be any suitable type of memory, such as fusible link, ROM, RAM, SRAM, and EEPROM. The memory 22 is used to store the control program executed by the central processing unit 20 as well as various data values representative of tire operating conditions or parameters, a unique tire identification code, the specific tire location on the vehicle, etc., as described hereafter.

The central processing unit 20 receives signals from sensing circuitry via the cable 15 through a digital I/O port 26 and an analog port 28. The digital I/O port 26 receives on/off signals from suitable sensors or other devices mounted on the substrate 12 or external to the substrate 12. The analog port 28 is connected on one ore more analog devices, such as a pressure sensor and/or a temperature sensor as described hereafter. Multiple digital or analog sensors may be multiplexed as single inputs to the digital I/O port 26 or to the analog port 28, respectively, or provided on separate digital or analog channels.

An Rf detector 34 receives an Rf signal from remote interrogation unit detected by an antenna 36 which contains a specific tire identification code. The signal is decoded by decoder 38 and input to the central processing unit 20 which compares this code with the corresponding tire identification code stored in the memory 22 to determine a match therebetween and proper identification of the tire on which the transponder 18 is mounted. This unique code identification enables a single remote interrogation unit to communicate with a selected one of a large number of tires, on one or multiple vehicles.

The antenna 36 may be any suitable antenna tuned to a particular resonating frequency. For example; the antenna 36 is depicted as being a patch antenna mounted on the substrate 12. Such a patch antenna is a single solid conductive plate whose surface area determines the tuned resonating frequency of the antenna 36. Other antenna types are also usable in the present apparatus depending on the frequency of the Rf signal from the interrogator. Thus, the antenna 36 can extend outward from the housing 7 and be mounted in the tire or exteriorly of the housing 7.

A pressure sensing means 50 is mounted in the housing 7 on the substrate 12 as shown in FIG. 2 and in greater detail in FIG. 6. An amplifier 52, FIGS. 4 and 5, may be provided on the substrate 12 to amplify the output signal of the pressure sensing means 50 prior to input to the transponder 18. Any suitable pressure sensor means 50 may be employed in the present invention which is suitable for measuring vehicle tire pressure. By way of example only, a silicone pressure sensor, model number NPC-103, made by Lucas NovaSensor of Fremont, Calif., may be employed. This sensor is a piezo-resistive sensor mounted in a ceramic surface mount package. Other types of pressure sensors may also be employed for the pressure sensing means 50.

As shown in detail in FIG. 6, the pressure sensor 50 is mounted on a ceramic base 51 joined to a sidewall which is situated in a well or recess 53 formed in and surrounded by the encapsulating medium or housing 7. The hollow cavity formed in the sidewall opens through an aperture 55 formed in the housing 12. A pressure transfer medium 57, such as a high temperature silicon filler, for example, is disposed in the interior cavity and extends from the upper surface of the cavity into contact with the pressure sensor 50 to transfer pressure from the tire to the pressure sensor 50. The exposed surface of the pressure transfer medium 57 is covered by a thin elastomeric or rubber membrane 59 mounted on one exterior surface of the housing 7 and which is exposed to the tire or the air chamber within the tire to transmit the tire air pressure to the transfer medium 57.

The pressure sensor 50 generates a millivolt output signal proportional to the input pressure acting thereon. This output signal is amplified by an op-amp 52 and input through the analog port 28 of the transponder 18, FIG. 3, to an analog/digital converter 54 which digitizes the signal prior to input to the central processing unit.

A temperature sensor means 110 is also be mounted on the substrate 12 and senses the temperature of the air within the vehicle tire or the temperature of the tire itself. The temperature sensor means 110 may be any suitable sensor which generates an analog output proportional to the sensed surrounding temperature. For example, a temperature sensor model no. LM 35 CAZ made by National Semiconductor, can be employed in the present invention. The output of the temperature sensor 110 is connected to and multiplexed through the analog port 28 of the transponder 18, converted to a digital value by the analog/digital converter 54 and input to the central processing unit 20. If necessary, an amplifier can be provided to amplify the output of the temperature sensor means 110 prior to input to the analog port 28.

According to a unique feature of the present invention, the apparatus 10 is provided with a tire revolution detector means 120 for detecting each revolution of the tire on which the apparatus 10 is mounted. The revolution detector means 120 shown in FIG. 4 may take any suitable form, such as a magnetic detector responsive to externally generated magnetic fields, which generates an output upon each complete 360° revolution of the tire. A G sensor may also be mounted on the substrate 12 to generate a signal for each up/down revolution of the sensor. The output of the revolution detector means 120 is input to a counter 122 which accumulates and stores the total tire revolution count. Upon receiving a signal from the transponder 18, the counter 122 outputs the total tire revolution count through the digital I/O port 26 to the central processing unit 20. The revolution detector 120 and the counter 122 are mounted on the substrate 12.

FIGS. 4 and 5 respectively show a block diagram and a schematic diagram of the operative elements of the apparatus 10. As shown in FIGS. 4 and 5, inputs to the transponder 18 include the output of the temperature sensor 110 which may optionally be provided through an operational amplifier as shown in FIG. 4. The operational amplifier 52 receives the amplified output of the pressure sensor 50 through the analog port 28.

The power source or battery 14 provides an output voltage labeled VBATT. This voltage is input to a driver 130 and a power switch circuit 132. The driver 130 is activated by a signal from the transponder 18, as described hereafter, and generates a signal to the power switch 132 which is formed of a pair of parallel MOSFETs, by way of example only. Upon initial receipt of an Rf signal from the remote interrogation sourced the transponder 18 generates a pulse to the first MOSFET 133 which applies power to all the components of the apparatus 10.

One output signal of the driver 130 is also input to a timer means 134 which generates an output which remains "on" for a predetermined time period. The timer 134 can be a separate component as shown in FIGS. 4 and 5, or its described timing function can be incorporated into the software executed by the processor 20 of the transponder 18.

The timer 134 output signal latches the control voltage VCC "on" for the predetermined time period by switching the other MOSFET 135 "on" to provide a window during which the temperature and pressure of the tire are sensed by the temperature sensor 110 and the pressure sensor 50, respectively. This time window also is used to return the sensed tire parameter temperature and pressure, as well as the revolution count and other parameters, as described hereafter, to the remote interrogation source.

In general, the interrogator 80, as shown in FIG. 9, generates an interrogation signal which is transmitted by transmitter 84 and picked up by the antenna 36 on a remotely located transponder 18. This activates the transponder 18, as described above, and causes the central processing unit 20 of the transponder 18 to poll the various sensors 50, 110, 122. The transponder 20 then backscatter modulates the sensor output data by passing the data to an encoder 70, shown in FIG. 3. The encoder 70 encodes the data by using various codes, such as those disclosed in U.S. Pat. No. 5,055,659, the contents of which are incorporated herein by reference. The encoded data is then passed to a modulator 72 which modulates the backscatter by changing the Rf load on the antenna 36 to send the encoded signals back to the interrogator 80. The backscatter modulation technique is described in greater detail in U.S. Pat. No. 4,739,328, the contents of which are also incorporated herein by reference.

As shown in FIG. 9, the interrogator or interrogation source 80 includes a suitable control 82, such as a central processing unit operating a stored control program. The control 82 selects a suitable data rate 90 and outputs interrogation signals with a specific transponder code through the transmitter 84 to an antenna 85. Backscatter modulated signals from the apparatus 10 are also received by the antenna 85 and input to a receiver 86. The backscatter modulated signal from the transponder 18 is passed by the antenna 85 to a receiver 86, decoded in decoder 87 and input to the control 82. The tire condition parameter data from one or more apparatus 10 may then be output from the interrogator 80 to a external host computer 90 by suitable communication circuits including parallel, RS-232, RS-485 and ETHERNET communication circuits and, also, retransmitted back to the RFID 18 for storage in the memory of the specified RFID 18.

In addition to transmitting tire, pressure and revolution count information, the transponder 18 is also capable of transmitting in each signal to the remote interrogation source various other tire data or information as shown in the following table.

TABLE 1

| Parameter Name | Units | Description |
| --- | --- | --- |
| Tire Status | N/A | Current Tire Status (Inventory, In-transit, mounted, vehicle, spare, discarded) |
| TMC Plant | N/A | TMC RP210 Plant Code |
| TMC Size | N/A | TMC RP210 Size Code |
| TMC Type | N/A | TMC RP210 Type Code |
| TMC Date | N/A | TMC RP210 Date |
| TMC Number | N/A | TMC RP210 Number |
| Vehicle ID | N/A | Vehicle ID |
| Target Pressure | kPa/6 | Desired tire pressure |
| Caution Low | kPa/6 | Low pressure caution limit |
| Caution High | kPa/6 | High pressure caution limit |
| Limit Low | kPa/6 | Low pressure limit |
| Limit High | kPa/6 | High pressure limit |
| Dual Caution Delta | kPa | Dual tire pressure differential caution limit |
| Dual Limit Delta | kPa | Dual tire pressure differential limit |
| Caution Temp | °C. + 55 | High temperature caution limit |
| Limit Temp | °C. + 55 | High temperature limit |
| Tire Location | N/A | Tire location on vehicle |
| Vehicle Tire Map | N/A | Vehicle tire location bitmap |
| Vehicle Type | N/A | Vehicle type code |
| Fleet Name | N/A | Fleet name |
| Min Pressure | kPa/6 | Minimum pressure encountered while on vehicle |
| Min Pressure Date | Days | Minimum pressure date |
| Min Pressure Distance | km/32 | Minimum pressure distance |
| Max Temperature | °C. + 55 | Maximum temperature encountered while on vehicle |
| Max Temperature Date | Days | Maximum temperature date |
| Max Temperature Distance | km/32 | Maximum temperature distance |
| Last Odo | km × 10 | Last odometer reading |
| Last Odo Date | Days | Last odometer reading date |
| Tire Total Distance | km × 10 | Total accumulated distance |
| Last Pressure | kPa/6 | Last pressure sample taken |
| Last Temperature | °C. + 55 | Last temperature sample taken |
| Last Date | Days | Last sample date |
| Last Distance | km/32 | Last sample distance |
| Fuel Used | liter × 10 | Total fuel used |
| Repair Records | N/A | Number of repair records |
| Repair Record | | |
| MX DOT 1 | N/A | DOT ID of repair/retread facility |
| MX Type 1 | N/A | Retread/repair code |
| MX Date 1 | Days | Maintenance date |
| MX Distance 1 | km/32 | Tire distance at repair/retread |

The transponder 18 is described above as receiving an activation signal from the remote interrogation source 80 which activates, assuming a proper identification code match exists, the transponder 18 for sensing the tire temperature, tire pressure and current tire revolution count. According to the present invention, a modification to the operation of the transponder 18 may be provided by modifying the control program stored in the memory 22 such that the transponder 18 activates on its own accord, in addition to an activation caused by the receipt of an activation signal from the remote interrogation source 80. The transponder 18, in this alternate mode of operation, can generate and supply the appropriate activation signal directly to the driver 130 which then activates the power switch 132 to turn on the timer 134 to set the appropriate data collection time window described above. This auto generation of the activation signal can be on a time basis at any selectible time interval.

Further, in this mode of operation, the transponder 18 functions to store in the memory 22 tire parameter information, such as pressure, temperature, current tire revolution count, at various times during the operation of the vehicle, such as once each day, once per start-up of the vehicle, etc., to provide a more accurate history of the operational characteristics of the tire. This is particularly important with respect to sensing maximum and/or minimum pressures and temperatures experienced by a particular tire during its operation.

Figure 7:
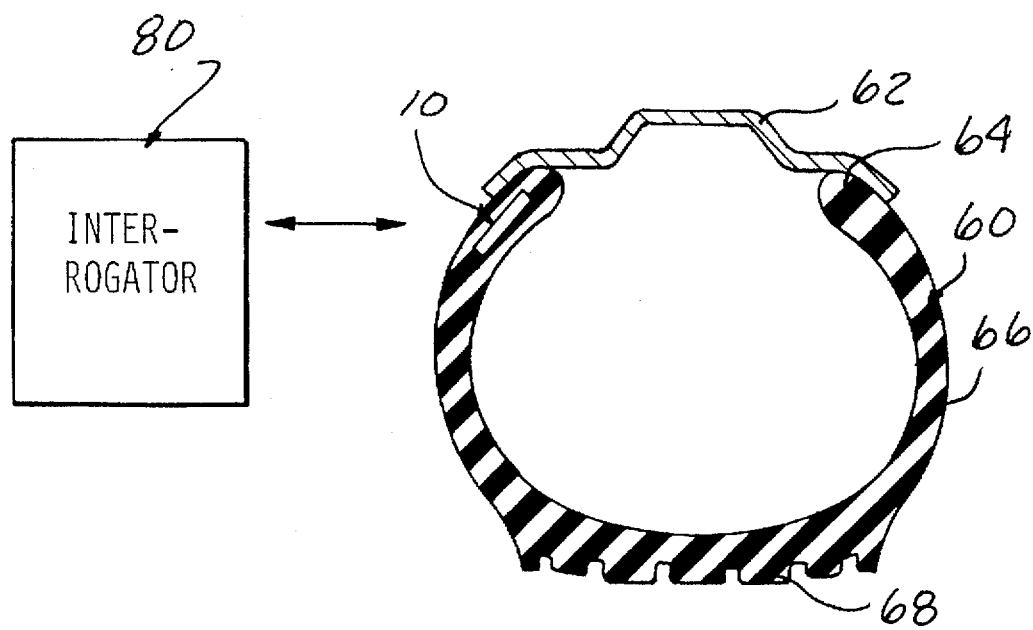
FIG. 7 is a cross sectional view showing the mounting of the apparatus within a vehicle tire.
Figure 8:
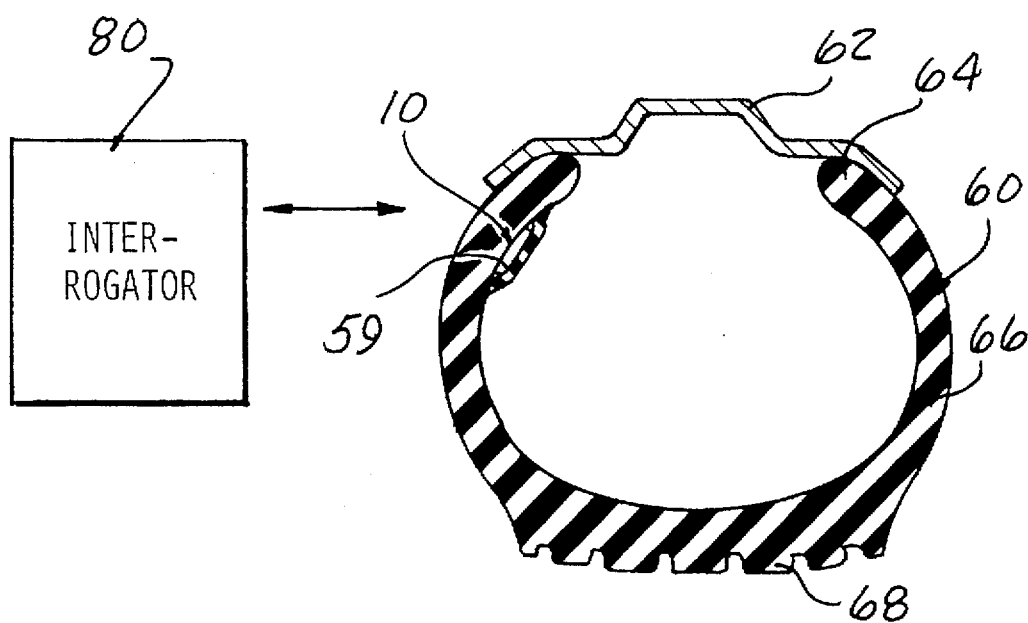
FIG. 8 is a cross sectional view showing the mounting of the apparatus on the inner liner of a vehicle tire.

Referring now to FIGS. 7 and 8, there are depicted two mounting positions for the apparatus 10 in or on a vehicle tire denoted generally by reference number 60. As is conventional, the tire 60 is mounted on a rim 62 and includes an inner bead 64 sealingly contacting the rim 62. A flexible side wall 66 extends from the bead 64 to a thread portion 68 of the tire 60. As shown in FIG. 7, the apparatus 10 may be integrally mounted within the tire 60 during the manufacture of the tire 60. A suitable mounting position is in the upper portion of the side wall 66 adjacent to the bead 64 as this location exhibits the least amount of flexure during use of the tire 60.

An alternate mounting position of the apparatus 10 is shown in FIG. 8. In this mounting embodiment, the apparatus 10 is mounted on the inner liner of the tire 60 adjacent to the bead 64. The elastomeric patch or membrane 59 is mounted over the apparatus 10 and sealingly joined to the inner liner to fixedly mount the apparatus 10 in registry with the tire 60.

In summary, there has been disclosed a unique apparatus which senses and send vehicle tire condition parameters to a remote interrogation unit. The apparatus is small in size so as to enable it to be easily mounted within a tire during the manufacture of the tire or, in the alternative, attached to the inner liner of the tire by means of an elastomeric patch. The apparatus contains an on board power source so as to accumulate tire operating parameters throughout the life of the tire and to accumulate such parameter values for communication to the interrogation unit upon receipt of an interrogation signal from the interrogation unit. In this manner, various tire parameter data, such as maximum and minimum tire pressures and temperatures experienced during the use of the tire, and the accumulative number of revolutions of the tire, may be provided to obtain a complete history of the use of the tire to determine its wear, potential remaining life, safe operating condition, etc.

What is claimed is:

1. An apparatus for sensing vehicle tire condition parameter data and for sending the sensed tire condition parameter data to a remote interrogator in response to an Rf signal from a remote interrogator, the apparatus comprising:

a housing adapted to be mounted on a vehicle tire;

a processor, a memory, and a receiver means connected to the processor means for receiving an interrogation signal from a remote interrogator, all mounted in the housing;

sensor means, mounted in the housing, for sensing a variable tire parameter and for generating an output signal to the processor means representative of the magnitude of the sensed tire parameter at a sensing time, the sensor means including means, mounted in the housing, for detecting and generating an output signal for each complete 360° revolution of the housing;

power supply means, mounted in the housing, for supplying electrical power to the processor means, the memory, the receiver means, and the sensor means; and backscatter modulating means, responsive to the receipt of the Rf signal from the interrogator, for backscatter-modulating the Rf signal with the output signal representative of the magnitude of the sensed tire condition parameter and for returning the backscatter modulated signal to the remote interrogator.

2. The apparatus of claim 1 wherein the detecting means further comprises:

counter means, responsive to the output signal from the detecting means, for totalizing the output signals from the detecting means as an accumulated revolution count.

3. An apparatus for sensing vehicle tire condition parameter data and for sending the sensed tire condition parameter data to a remote interrogator in response to an Rf signal from a remote interrogator, the apparatus comprising:

a housing adapted to be mounted on a vehicle tire;

a processor, a memory, and a receiver means connected to the processor means for receiving an interrogation signal from a remote interrogator, all mounted in the housing;

sensor means, mounted in the housing, for sensing a variable tire parameter and for generating an output signal to the processor means representative of the magnitude of the sensed tire parameter at a sensing time;

power supply means, mounted in the housing, for supplying electrical power to the processor means, the memory, the receiver means, and the sensor means;

backscatter modulating means, responsive to the receipt of the Rf signal from the interrogator, for backscatter-modulating the Rf signal with the output signal representative of the magnitude of the sensed tire condition parameter and for returning the backscatter modulated signal to the remote interrogator; and wherein the processor monitors the output signals of the sensor means to detect at least one of maximum and minimum values of a tire condition parameter over a predetermined time period.

4. The apparatus of claim 3 wherein the sensor means comprises:

pressure sensor means, mounted on the housing, for sensing air pressure of a tire on which the housing is mounted.

5. The apparatus of claim 3 wherein the sensor means comprises:

temperature sensor means, mounted in the housing, for sensing temperature of a tire on which the housing is mounted.

6. An apparatus of for sensing vehicle tire condition parameter data and for sending the sensed tire condition parameter data to a remote interrogator in response to an Rf signal from a remote interrogator, the apparatus comprising:

a housing adapted to be mounted on a vehicle tire;

a processor, a memory, and a receiver means connected to the processor means for receiving an interrogation signal from a remote interrogator, all mounted in the housing;

sensor means, mounted in the housing, for sensing a variable tire parameter and for generating an output signal to the processor means representative of the magnitude of the sensed tire parameter at a sensing time;

power supply means, mounted in the housing, for supplying electrical power to the processor means, the memory, the receiver means, and the sensor means;

backscatter modulating means, responsive to the receipt of the Rf signal from the interrogator, for backscatter-modulating the Rf signal with the output signal representative of the magnitude of the sensed tire condition parameter and for returning the backscatter modulated signal to the remote interrogator; and timer means, responsive to an activation signal from the processor means and connected to the sensor means, for activating the sensor means to sense a tire condition parameter only during a predetermined time period set by the timer means.

7. The apparatus of claim 6 wherein:

the processor means generates the activation signal to the timer means in response to the receipt of the Rf signal received from the remote interrogator.

8. An apparatus for sensing vehicle tire condition parameter data and for sending the sensed tire condition parameter data to a remote interrogator in response to an Rf signal from a remote interrogator, the apparatus comprising:

a housing adapted to be mounted on a vehicle tire;

a processor, a memory, and a receiver means connected to the processor means for receiving an interrogation signal from a remote interrogator, all mounted in the housing;

sensor means, mounted in the housing, for sensing a variable tire parameter and for generating an output signal to the processor means representative of the magnitude of the sensed tire parameter at a sensing time; the sensor means including:

pressure sensor means, mounted in the housing, for sensing air pressure of a tire on which the housing is mounted;

temperature sensor means, mounted in the housing, for sensing temperature of a tire on which the housing is mounted; and means, mounted in the housing, for detecting and generating an output signal for each complete 360° revolution of the housing;

power supply means, mounted in the housing, for supplying electrical power to the processor means, the memory, the receiver means, and the sensor means; and backscatter modulating means, responsive to the receipt of the Rf signal from the interrogator, for backscatter-modulating the Rf signal with the output signal representative of the magnitude of the sensed tire condition parameter and for returning the backscatter modulated signal to the remote interrogator.

9. The apparatus of claim 8 further comprising:

timer means, responsive to an activation signal from the processor means and connected to the pressure sensor means and the temperature sensor means, for activating the pressure sensor means and the temperature sensor means to sense tire pressure and tire temperature, respectively, only during a predetermined time period set by the timer means.

10. The apparatus of claim 9 wherein:

the processor means generates the activation signal separate from receiving the Rf signal at a predetermined selectible time interval.

11. The apparatus of claim 8 wherein:

the housing is formed of an encapsulating material encapsulating the processor means, the memory, the receiver means, the power supply, the sensor means and the backscatter modulating means.

12. The apparatus of claim 8 wherein the pressure sensor means comprises:

a pressure transducer and a pressure transmitting medium disposed in contact with the pressure transducer and adapted to be exposed to an air chamber in a tire on which the housing is mounted.

13. A vehicle tire parameter sensing apparatus adapted for use with a vehicle tire comprising:

control means having an interrogator transmitter means for transmitting an Rf interrogation signal and an interrogator receiver means for receiving remotely generated signals; and a transponder adapted to be mountable on a vehicle tire, the transponder including:

a housing adapted to be mountable on a vehicle tire;

a processor, a memory, and a receiver means connected to the processor means for receiving the Rf interrogation signal from the control means, all mounted in the housing;

sensor means, mounted in the housing, for sensing a variable tire parameter and for generating an output signal to the processor means representative of the magnitude of the sensed tire parameter at a sensing time;

backscatter modulating means, responsive to the receipt of the Rf interrogation signal from the control means, for backscatter-modulating the Rf signal with the output signal representative of the magnitude of the sensed tire condition parameter and returning the backscatter modulated signal to the control means;

power supply means, mounted in the housing, for supplying electrical power to the processor means, the memory, the receiver means, the backscatter modulating means and the sensor means; and wherein the processor monitors the output signals of the sensor means to detect at least one of maximum and minimum values of a tire condition parameter over a predetermined time period.

14. The apparatus of claim 13 wherein the sensor means comprises:

pressure sensor means, mounted in the housings for sensing air pressure of a tire on which the housing is mounted.

15. The apparatus of claim 13 wherein the sensor means comprises:

temperature sensor means, mounted in the housing, for sensing temperature of a tire on which the housing is mounted.

16. A vehicle tire parameter sensing apparatus adapted for use with a vehicle tire comprising:

control means having an interrogator transmitter means for transmitting an Rf interrogation signal and an interrogator receiver means for receiving remotely generated signals; and a transponder adapted to be mountable on a vehicle wire, the transponder including:

a housing adapted to be mountable on a vehicle tire;

a processor, a memory, and a receiver means connected to the processor means for receiving the Rf interrogation signal from the control means, all mounted in the housing;

sensor means, mounted in the housing, for sensing a variable tire parameter and for generating an output signal to the processor means representative of the magnitude of the sensed tire parameter at a sensing time; the sensor means including means for detecting and generating an output signal for each complete 360° rotation of a tire on which the housing is mounted;

backscatter modulating means, responsive to the receipt of the Rf interrogation signal from the control means, for backscatter-modulating the Rf signal with the output signal representative of the magnitude of the sensed tire condition parameter and returning the backscatter modulated signal to the control means; and power supply means, mounted in the housing, for supplying electrical power to the processor means, the memory, the receiver means, the backscatter modulating means and the sensor means.

17. The apparatus of claim 16 wherein the detecting means further comprises:

counter means, responsive to the output signal from the detecting means, for totalizing the output signals from the detecting means as an accumulated tire revolution count.

18. A vehicle tire parameter sensing apparatus adapted for use with a vehicle tire comprising:

control means having an interrogator transmitter means for transmitting an Rf interrogation signal and an interrogator receiver means for receiving remotely generated signals; and a transponder adapted to be mountable on a vehicle tire, the transponder including:

a housing adapted to be mountable on a vehicle tire;

a processor, a memory, and a receiver means connected to the processor means for receiving the Rf interrogation signal from the control means, all mounted in the housing;

sensor means, mounted in the housing, for sensing a variable tire parameter and for generating an output signal to the processor means representative of the magnitude of the sensed tire parameter at a sensing time;

backscatter modulating means, responsive to the receipt of the Rf interrogation signal from the control means, for backscatter-modulating the Rf signal with the output signal representative of the magnitude of the sensed tire condition parameter and returning the backscatter modulated signal to the control means;

power supply means, mounted in the housing, for supplying electrical power to the processor means, the memory, the receiver means, the backscatter modulating means and the sensor means; and timer means, responsive to an activation signal from the processor means and connected to the sensor means, for activating the sensor means to sense a tire condition parameter only during a predetermined time period set by the timer means.

19. The apparatus of claim 18 wherein:

the processor means generates the activation signal to the timer means in response to the interrogation signal received from the control means.

20. A vehicle tire parameter sensing apparatus adapted for use with a vehicle tire comprising:

control means having an interrogator transmitter means for transmitting an Rf interrogation signal and an interrogator receiver means for receiving remotely generated signals; and a transponder adapted to be mountable on a vehicle tire, the transponder including:

a housing adapted to be mountable on a vehicle tire;

a processor, a memory, and a receiver means connected to the processor means for receiving the Rf interrogation signal from the control means, all mounted in the housing;

sensor means, mounted in the housing, for sensing a variable tire parameter and for generating an output signal to the processor means representative of the magnitude of the sensed tire parameter at a sensing time, the sensor means comprising at least one of:

pressure sensor means, mounted in the housing, for sensing air pressure of a tire on which the housing is mounted, the pressure sensor means includes a pressure transducer and a pressure transmitting medium adapted to be disposed in contact with the pressure transducer and exposed to an air chamber in a tire on which the housing is mounted;

temperature sensor means, mounted in the housing, for sensing temperature of a tire on which the housing is mounted; and means, mounted on the housing, for detecting and generating an output signal for each complete 360° revolution of a tire on which the housing is mounted, the detecting means further including counter means, responsive to the output signal from the detecting means, for totalizing the output signals from the detecting means as an accumulated tire revolution count;

backscatter modulating means, responsive to the receipt of the Rf interrogation signal from the control means, for backscatter-modulating the Rf signal with the output signal representative of the magnitude of the sensed tire condition parameter and returning the backscatter modulated signal to the control means; and power supply means, mounted in the housing, for supplying electrical power to the processor means, the memory, the receiver means, the backscatter modulating means and the sensor means.

21. A vehicle tire parameter sensing apparatus adapted for use with a vehicle tire comprising:

control means having an interrogator transmitter means for transmitting an Rf interrogation signal and an interrogator receiver means for receiving remotely generated signals; and a transponder adapted to be mountable on a vehicle tire, the transponder including:

a housing adapted to be mountable on a vehicle tire;

a processor, a memory, and a receiver means connected to the processor means for receiving the Rf interrogation signal from the control means, all mounted in the housing;

sensor means, mounted in the housing, for sensing a variable tire parameter and for generating an output signal to the processor means representative of the magnitude of the sensed tire parameter at a sensing time, the sensor means including:

pressure sensor means, mounted in the housing, for sensing air pressure of a tire on which the housing is mounted;

temperature sensor means, mounted in the housing, for sensing temperature of a tire on which the housing is mounted; and means, mounted in the housing, for detecting and generating an output signal for each complete 360° revolution of a tire on which the housing is mounted;

backscatter modulating means, responsive to the receipt of the Rf interrogation signal from the control means, for backscatter-modulating the Rf signal with the output signal representative of the magnitude of the sensed tire condition parameter and returning the backscatter modulated signal to the control means; and power supply means, mounted in the housing, for supplying electrical power to the processor means, the memory, the receiver means, the backscatter modulating means and the sensor means.

22. The apparatus of claim 21 wherein the pressure sensor means comprises:

a pressure transducer and a pressure transmitting medium disposed in contact with the pressure transducer and adapted to be exposed to an air chamber in a tire on which the housing is mounted.

23. The apparatus of claim 21 wherein:

the housing is formed of an encapsulating material encapsulating the processor means, the memory, the receiver means, the transmitter means, the power supply, the sensor means and the backscatter-modulating means.

24. A method for sensing tire condition parameters comprising the steps of:

mounting a housing on a tire in communication with the tire;

mounting a processor, a memory, and a receiver means connected to the processor means for receiving an Rf interrogation signal from a remote interrogator in the housing;

mounting sensor means in the housing for sensing at least one tire parameter, the sensor means generating an output signal to the processor means representative of a magnitude of the sensed tire parameter at a sensing time;

monitoring the output signals of the sensor means to detect at least one of maximum and minimum values of a tire condition parameter over a predetermined time period;

mounting a backscatter-modulating means in communication with the processor means, for backscattering modulating the Rf interrogation signal from the interrogator with the output signal representative of the magnitude sensed tire condition parameter;

mounting a power supply in the housing, the power supply connected to and supplying electrical power to the processor means, the memory, the receiver means, and the sensor means; and mounting an antenna on the housing and connecting the antenna to the receiver means and the backscatter modulating means.

25. The method of claim 24 wherein the step of mounting a sensor means further comprises the step of:

mounting a pressure sensor in the housing for sensing air pressure of a tire; and disposing the pressure sensor in communication with an air chamber of a tire.

26. The method of claim 24 wherein the step of mounting a sensor means further comprises the step of:

mounting a temperature sensor in the housing for sensing temperature of a tire.

27. A method for sensing tire condition parameters comprising the steps of:

mounting a housing on a tire in communication with the tire;

mounting a processor, a memory, and a receiver means connected to the processor means for receiving an Rf interrogation signal from a remote interrogator in the housing;

mounting sensor means in the housing for sensing at least one tire parameter, the sensor means generating an output signal to the processor means representative of a magnitude of the sensed tire parameter at a sensing time, the step of mounting the sensor means further including mounting a detector in the housing, the detector generating an output signal for each complete 360° revolution of the housing;

mounting a backscatter-modulating means in communication with the processor means, for backscattering modulating the Rf interrogation signal from the interrogator with the output signal representative of the magnitude sensed tire condition parameter;

mounting a power supply in the housing, the power supply connected to and supplying electrical power to the processor means, the memory, the receiver means, and the sensor means; and mounting an antenna on the housing and connecting the antenna to the receiver means and the backscatter modulating means.

28. The method of claim 27 further comprising the step of:

providing a counter, responsive to the output signal from the detecting means, for totalizing the output signals from the detecting means as an accumulated revolution count.

29. A method for sensing tire condition parameters comprising the steps of:

mounting a housing on a tire in communication with the tire;

mounting a processor, a memory, and a receiver means connected to the processor means for receiving an Rf interrogation signal from a remote interrogator in the housing;

mounting sensor means in the housing for sensing at least one tire parameter, the sensor means generating an output signal to the processor means representative of a magnitude of the sensed tire parameter at a sensing time;

mounting a backscatter-modulating means in communication with the processor means, for backscattering modulating the Rf interrogation signal from the interrogator with the output signal representative of the magnitude sensed tire condition parameter;

mounting a power supply in the housing, the power supply connected to and supplying electrical power to the processor means, the memory, the receiver means, and the sensor means;

mounting an antenna on the housing and connecting the antenna to the receiver means and the backscatter modulating means; and activating a timer means in response to an activation signal from the processor means for activating the sensor means to sense a tire condition parameter only during a predetermined time period set by the timer means.

30. The method of claim 29 further comprising the step of:

the processor means generating the activation signal to the timer means in response to the Rf interrogation signal received from the interrogator.

31. A method for sensing tire condition parameters comprising the steps of:

mounting a housing on a tire in communication with the tire;

mounting a processor, a memory, and a receiver means connected to the processor means for receiving an Rf interrogation signal from a remote interrogator in the housing;

mounting sensor means in the housing for sensing at least one tire parameter, the sensor means generating an output signal to the processor means representative of a magnitude of the sensed tire parameter at a sensing time, the step of mounting the sensor means including the steps of:

mounting a pressure sensor in the housing for sensing air pressure of a tire;

mounting a temperature sensor in the housing for sensing temperature of a tire; and mounting a detector means in the housing for detecting and generating an output signal for each complete 360° revolution of the housing;

mounting a backscatter-modulating means in communication with the processor means, for backscattering modulating the Rf interrogation signal from the interrogator with the output signal representative of the magnitude sensed tire condition parameter;

mounting a power supply in the housing, the power supply connected to and supplying electrical power to the processor means, the memory, the receiver means, and the sensor means; and mounting an antenna on the housing and connecting the antenna to the receiver means and the backscatter modulating means.

32. The method of claim 31 wherein the step of mounting the pressure sensor further comprises the steps of:

mounting a pressure transducer in the housing;

mounting a pressure transmitting medium in contact with the pressure transducer and adapted to be exposed to an air chamber in a tire.

* * * * *